United States Patent
Pearce

(10) Patent No.: US 11,856,935 B2
(45) Date of Patent: *Jan. 2, 2024

(54) FISH ATTRACTANT DISPERSAL APPARATUS

(71) Applicant: PEARCE OUTDOORS LLC, Mesa, AZ (US)

(72) Inventor: Grant Pearce, Mesa, AZ (US)

(73) Assignee: Pearce Outdoors LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,993

(22) Filed: Jan. 21, 2022

(65) Prior Publication Data
US 2022/0142134 A1   May 12, 2022

Related U.S. Application Data

(63) Continuation of application No. 16/363,346, filed on Mar. 25, 2019, now Pat. No. 11,234,425.

(60) Provisional application No. 62/793,991, filed on Jan. 18, 2019.

(51) Int. Cl.
*A01K 97/04*   (2006.01)
*A01K 85/01*   (2006.01)

(52) U.S. Cl.
CPC .......... *A01K 97/045* (2013.01); *A01K 85/01* (2013.01)

(58) Field of Classification Search
CPC ...... A01K 85/01; A01K 85/005; A01K 97/02; A01K 97/04; A01K 97/045
See application file for complete search history.

(56) References Cited

U.S. PATENT DOCUMENTS

| | | | | |
|---|---|---|---|---|
| 4,973,416 | A * | 11/1990 | Kennedy | C11D 17/043 510/303 |
| 5,735,105 | A * | 4/1998 | Stroud | A61J 3/07 425/804 |
| 6,448,212 | B1 * | 9/2002 | Holderbaum | C11D 17/042 510/276 |
| 6,848,210 | B1 * | 2/2005 | Altman | A01K 97/02 43/44.99 |
| 7,127,874 | B2 * | 10/2006 | Viltro | C11D 3/3942 53/478 |
| 8,656,689 | B2 * | 2/2014 | Denome | B65D 65/46 53/432 |
| 9,073,294 | B2 * | 7/2015 | Kumar | B32B 7/05 |
| 2005/0081424 | A1 * | 4/2005 | Glasser | A01K 79/02 43/42.22 |

(Continued)

OTHER PUBLICATIONS

USPTO, Non-Final Office Action dated Jul. 9, 2021 in U.S. Appl. No. 16/363,346.

(Continued)

*Primary Examiner* — Richard G Davis
(74) *Attorney, Agent, or Firm* — Snell & Wilmer L.L.P.

(57) ABSTRACT

A fish attractant dispersal apparatus may comprise a dispersal pouch encompassing fish attractant. The dispersal pouch may comprise a water-soluble material configured to dissolve in water to release the fish attractant. The dispersal pouch may define an attractant cavity configured to encompass and seal the fish attractant. The attractant cavity may be sealed to at least partially reduce air trapped within the attractant cavity. The attractant cavity may be sealed to remove air within the attractant cavity.

8 Claims, 12 Drawing Sheets

(56) References Cited

U.S. PATENT DOCUMENTS

| | | | | |
|---|---|---|---|---|
| 2007/0124986 A1* | 6/2007 | Boozer | ............... | A01K 91/06 |
| | | | | 43/44.99 |
| 2011/0038981 A1* | 2/2011 | Kapner | ............... | A01K 97/02 |
| | | | | 43/44.99 |
| 2015/0359226 A1* | 12/2015 | Brady | ............... | B29C 39/003 |
| | | | | 424/84 |
| 2016/0340068 A1* | 11/2016 | Brandt Sanz | ............ | B65B 1/02 |
| 2018/0310593 A1* | 11/2018 | Clark | ............... | A01K 97/045 |

OTHER PUBLICATIONS

USPTO, Notice of Allowance dated Sep. 28, 2021 in U.S. Appl. No. 16/363,346.

\* cited by examiner

FISH ATTRACTANT DISPERSAL APPARATUS

CROSS REFERENCE TO RELATED APPLICATIONS

This application is a continuation of, and claims priority to and the benefit of, U.S. patent application Ser. No. 16/363,346, filed Mar. 25, 2019 and entitled "FISH ATTRACTANT DISPERSAL APPARATUS," which is a nonprovisional application of, and claims priority to and the benefit of, U.S. Provisional Patent Application Ser. No. 62/793,991, filed Jan. 18, 2019 and entitled "WATER SOLUBLE FISH ATTRACTING POD," both of which are incorporated by reference herein.

FIELD

The present disclosure relates to the dispersal of fish attractant, and more specifically, to a water-soluble fish attractant dispersal apparatus.

BACKGROUND

A user may attempt to catch fish using a fishing rod. The fishing rod may comprise a rod, a fishing line attached to the fishing rod, and a hook at an end of the fishing line. The user may place a bait or lure on the end of the hook, and may cast the bait or lure into a body of water to attempt to catch the fish. Users may throw additional bait into the body of water to attract fish proximate the baited hook (e.g., "chumming"). However, the bait may float in the water, land in the water away from the baited hook, or spread out ineffectively in the water. Users may bundle the bait into a bag, netting, or the like to attempt to effectively distribute the bait proximate the baited hook. However, air trapped in the bundled bait may cause the bundled bait to float in the water, thus ineffectively distributing the bundled bait. Moreover, the defined process of chumming is illegal in some states and countries.

SUMMARY

In various embodiments, a fish attractant dispersal apparatus is disclosed. The fish attractant dispersal apparatus may comprise a dispersal pouch. The dispersal pouch may define a sealed attractant cavity. The dispersal pouch may comprise a water-soluble material. The fish attractant dispersal apparatus may comprise a fish attractant disposed within the sealed attractant cavity. The sealed attractant cavity may be configured to encompass the fish attractant to at least partially reduce air within the sealed attractant cavity.

In various embodiments, the fish attractant may comprise one or more of a solid fish attractant, an amino acid, and/or an oil-based fish attractant. The solid fish attractant may comprise one or more of a blood meal, a bloodworm meal, a crayfish meal, a fish meal, a kelp meal, a liver meal, a mussel meal or extract, a shrimp meal, a squid meal, a vanilla meal, an animal protein, a corn, a wheat, a bread, a liver, a krill, a fructose, a garlic, a spirulina, a chili powder, a salt, a bird food or seed, a hemp seed, an almond flour, a milk powder, a peanut flour, a tiger nut flour, and/or a yeast powder. The amino acid may comprise one or more of alanine, arginine, betaine, glutamate, glycine, inosine, isoleucine, L-glutamic acid, leucine, methionine, phenylalanine, proline, taurine, tryptophan, urea, and/or valine. The oil-based fish attractant may comprise one or more of a liquid betaine, a black pepper oil, a liquid bloodworm extract, a cod liver oil, a fish oil, a hemp oil, a krill oil, molasses, n-butyric acid, an olive oil, a pilchard oil, a shrimp oil, a sunflower oil, a liquid sweetener, and/or a thyme oil. The fish attractant may comprise one or more of a powder, a liquid, and/or a pellet. The fish attractant may comprise an amount of about 0.5 ounces, about 1.0 to about 2.0 ounces, or about 5.0 ounces. The amount of fish attractant may be configurable based on a fish type or a fishing rod action.

In various embodiments, a water-soluble fish attractant dispersal apparatus is disclosed. The water-soluble fish attractant dispersal apparatus may comprise a dispersal pouch. The dispersal pouch may comprise an outer surface; an inner surface opposite the outer surface; a surface edge defining an outer edge of the outer surface; and an attractant cavity defined by the inner surface and the surface edge. The water-soluble fish attractant dispersal apparatus may comprise a fish attractant disposed within the attractant cavity. The attractant cavity may be sealed to at least partially reduce air within the attractant cavity.

In various embodiments, the attractant cavity may be vacuum sealed to remove air from the attractant cavity. In various embodiments, the attractant cavity may be sealed with a mechanical force to remove air from the attractant cavity. The dispersal pouch may comprise a quadrilateral shape, a triangular shape, or an aerodynamic shape. The dispersal pouch may comprise a water-soluble paper material or a polyvinyl alcohol material. The dispersal pouch may comprise a material property configured to control a time period of dissolution of the dispersal pouch. The time period of dissolution may comprise about fifteen (15) seconds to about forty-five (45) seconds. The material property of the dispersal pouch may comprise one or more of a material type, a material thickness, and/or a material surface type. The dispersal pouch may also comprise a hook tab extending from the surface edge, wherein the hook tab is configured to receive a fishing hook. The water-soluble fish attractant dispersal apparatus may also comprise a weight coupled to at least one of the surface edge, the outer surface, or the attractant cavity of the dispersal pouch.

In various embodiments, a multi-chambered fish attractant dispersal apparatus is disclosed. The multi-chambered fish attractant dispersal apparatus may comprise a dispersal pouch. The dispersal pouch may define a plurality of sealed attractant cavities. The dispersal pouch may comprise a water-soluble material. The multi-chambered fish attractant dispersal apparatus may comprise a fish attractant disposed within each sealed attractant cavity. Each of the plurality of sealed attractant cavities may be configured to release the fish attractant in response to the dispersal pouch being in contact with a liquid.

In various embodiments, a first sealed attractant cavity of the plurality of sealed attractant cavities may comprise a first fish attractant and a second attractant cavity of the plurality of sealed attractant cavities may comprise a second fish attractant. The first fish attractant and the second fish attractant may comprise a different fish attractant type. In various embodiments, a third sealed attractant cavity of the plurality of sealed attractant cavities may comprise a third outer surface having a first rate of dissolution and a fourth sealed attractant cavity of the plurality of sealed attractant cavities may comprise a fourth outer surface having a second rate of dissolution. The first rate of dissolution may be different than the second rate of dissolution.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
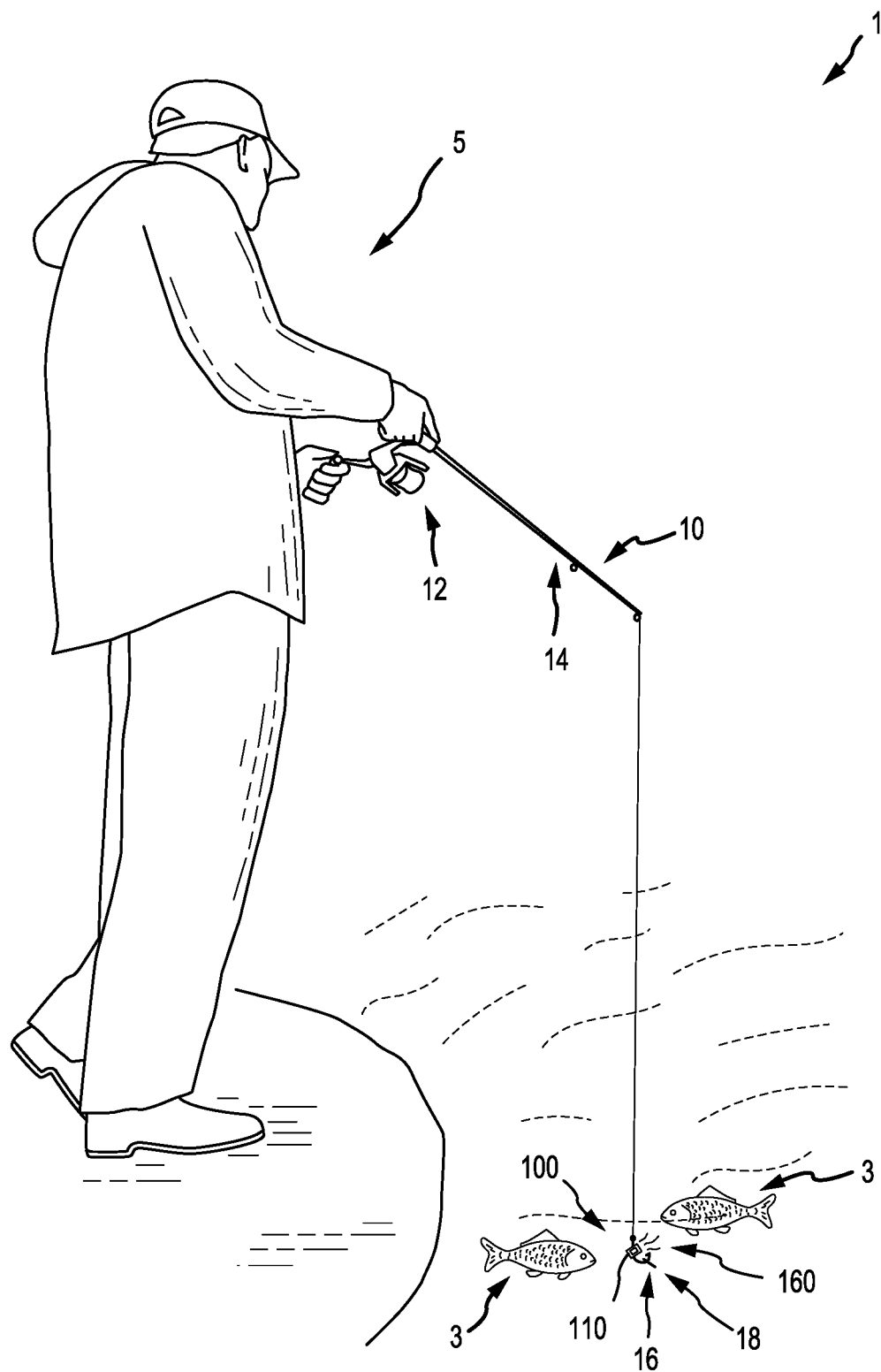
FIG. 1 illustrates a system for dispersing fish attractant, in accordance with various embodiments.

In various embodiments, and with reference to FIG. 1, a system 1 for dispersing fish attractant is disclosed. A user 5 may attempt to catch a fish 3 using a fishing rod 10. Fishing rod 10 may comprise any suitable type of fishing rod (e.g., casting rod, spinning rod, fly rod, etc.), and may comprise any suitable or desired length, power, and action. Fishing rod 10 may comprise a fishing line 14 coupled to fishing rod 10 at a first end. For example, and in accordance with various embodiments, fishing line 14 may be directly coupled to fishing rod 10 (e.g., a fly fishing rod). For example, and in accordance with various embodiments, fishing line 14 may be coupled to fishing rod 10 via a fishing reel 12. Fishing reel 12 may comprise a spincast reel, a baitcasting reel, a spinning reel, a fly reel, or any other suitable or desired type of fishing reel. Fishing reel 12 may be coupled to an operating end of fishing rod 10 and may store and distribute fishing line 14. For example, in response to user 5 activating a casting mechanism on fishing reel 12, fishing reel 12 may distribute fishing line 14. A second end of the fishing line 14 may be coupled to one or more hooks 16. Hook 16 may comprise a bait hook, a circle hook, a worm hook, a treble hook, and/or any other suitable or desired hooking mechanism. User 5 may place one or more bait 18 through hook 16, such as, for example, a live bait (e.g., a worm, a baitfish, insects, etc.), food (e.g., corn, liver, fish, etc.), an artificial bait, and/or the like. In various embodiments, hook 16 and bait 18 may also comprise an integrated object, such as a lure or artificial bait.

In various embodiments, user 5 may couple a fish attractant dispersal apparatus 100 to hook 16 before casting using fishing rod 10. Fish attractant dispersal apparatus 100 may be coupled to hook 16 after the coupling of bait 18 to hook 16. Fish attractant dispersal apparatus 100 may also be coupled to hook 16 before the coupling of bait 18 to hook 16. Fish attractant dispersal apparatus 100 may comprise a dispersal pouch 110 encompassing a fish attractant 160. As discussed further herein, dispersal pouch 110 may be configured to dissolve in water to release fish attractant 160 into the water. For example, user 5 may operate fishing rod 10 by casting fishing line 14, hook 16, bait 18, and fish attractant dispersal apparatus 100 into the body of water to attempt to catch the fish 3. In various embodiments, and as discussed further herein, dispersal pouch 110 may at least partially dissolve to release fish attractant 160 proximate hook 16 and bait 18 in the water. In that regard, the fish 3 may be attracted to fish attractant 160, which may operate to attract fish 3 proximate bait 18 and hook 16.

Figure 2:
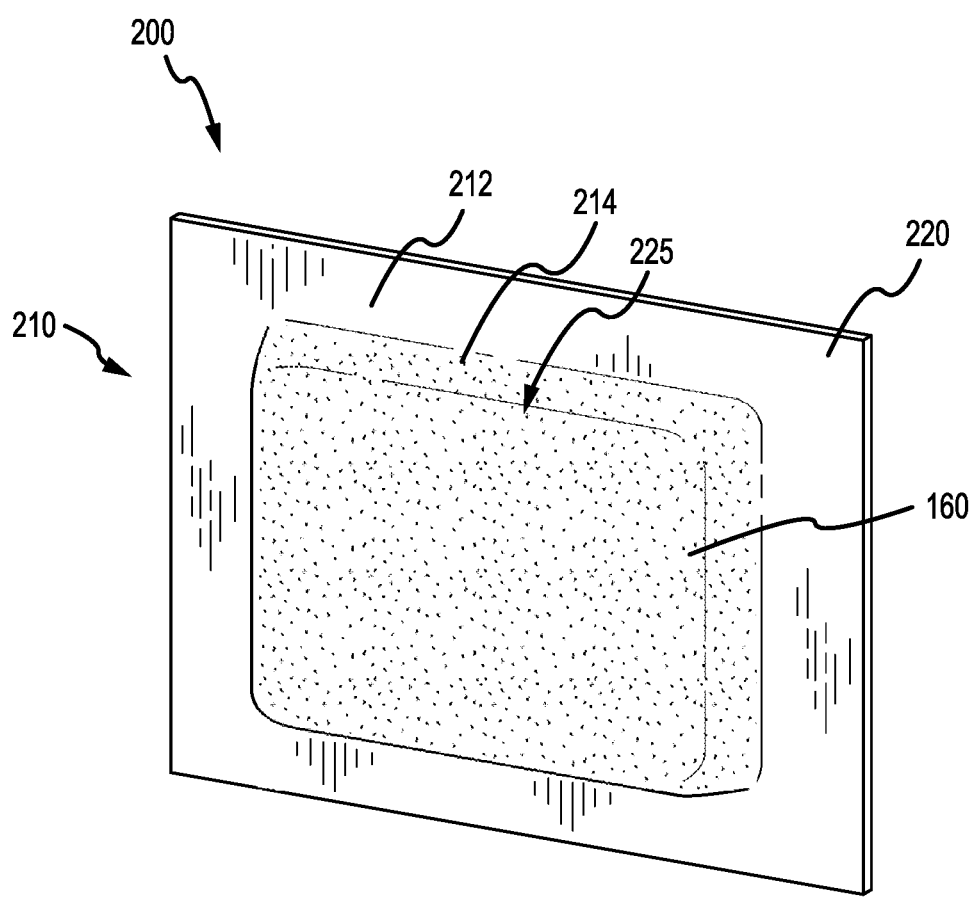
FIG. 2 illustrates a perspective view of a fish attractant dispersal apparatus, in accordance with various embodiments.

In various embodiments, and with reference to FIG. 2, a fish attractant dispersal apparatus 200 is depicted in greater detail. Fish attractant dispersal apparatus 200 may comprise a dispersal pouch 210 encompassing a fish attractant 160. Fish attractant dispersal apparatus 200 may be configured to disperse fish attractant 160 from dispersal pouch 210 to attract fish when fishing. For example, fish attractant dispersal apparatus 200 may be attached to a hook of a fishing rod, and may be cast together with fishing bait into a body of water. In response to being in contact with (e.g., submerged in) the water, dispersal pouch 210 may disperse fish attractant 160. As a further example, fish attractant dispersal apparatus 200 may be thrown by a user into a body of water. In response to being in contact with the water, dispersal pouch 210 may disperse fish attractant 160.

In various embodiments, dispersal pouch 210 may comprise an outer surface 212 opposite an inner surface 214. Inner surface 214 may define an attractant cavity 225 configured to encompass and store fish attractant 160. Attractant cavity 225 may be sized and shaped to encompass and store fish attractant 160. For example, and as discussed further herein, attractant cavity 225 may be configured to encompass fish attractant 160 such that no air (or other gas) is stored in attractant cavity 225 with fish attractant 160. For example, attractant cavity 225 may be sealed to at least partially reduce air (or other gas) from being stored within attractant cavity 225.

Outer surface 212 may define a surface edge 220. Surface edge 220 may comprise an outer edge of dispersal pouch 210 that at least partially surrounds and defines attractant cavity 225. For example, and in accordance with various embodiments, surface edge 220 may entirely surround attractant cavity 225 (e.g., as depicted in FIG. 2). As a further example, and in accordance with various embodiments, surface edge 220 may only partially surround attractant cavity 225, and outer surface 212 may define the remainder of attractant cavity 225 (e.g., surface edge 220 surrounds at most three of the four sides of attractant cavity 225). Surface edge 220 may comprise any suitable or desired shape and/or dimensions (e.g., thickness, length, width, etc.).

Dispersal pouch 210 may comprise any shape and/or dimensions. For example, dispersal pouch 210 may comprise a quadrilateral shape (e.g., a square, a rectangle, etc.), a triangular shape, and/or any other shape. In various embodiments, the shape and/or dimensions of dispersal pouch 210 (and/or elements of dispersal pouch 210) may be dependent on a manufacturing process used to create fish attractant dispersal apparatus 200 and/or dispersal pouch 210, as discussed further herein.

Figure 3:
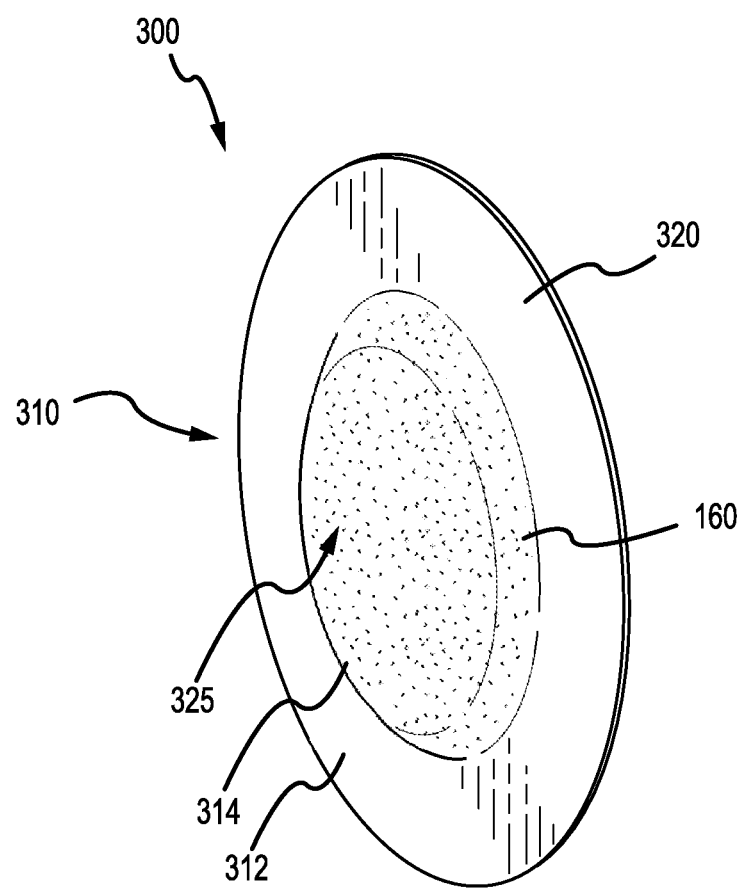
FIG. 3 illustrates a perspective view of a fish attractant dispersal apparatus comprising a circular shape, in accordance with various embodiments.

In various embodiments, and with reference to FIG. 3, a fish attractant dispersal apparatus 300 may comprise a dispersal pouch 310 having a circular and/or aerodynamic shape. Fish attractant dispersal apparatus 300 may be similar to fish attractant dispersal apparatus 200, with brief reference to FIG. 2. Dispersal pouch 310 may be similar to dispersal pouch 210, with brief reference to FIG. 2, and may comprise an outer surface 312 opposite an inner surface 314. Inner surface 314 may define an attractant cavity 325 configured to encompass and store fish attractant 160. Dispersal pouch 310 may comprise a circular, oval, and/or any other aerodynamic shape. In that regard, dispersal pouch 310 may be sized and shaped to comprise aerodynamic characteristics to aid the user in operating fish attractant dispersal apparatus 300 (e.g., casting using fish attractant dispersal apparatus 300, throwing fish attractant dispersal apparatus 300, etc.). In various embodiments, attractant cavity 325 may also comprise any suitable shape. For example, attractant cavity 325 may be circular or oval shaped, or may comprise a quadrilateral shape, a triangular shape, and/or any other suitable shape. In various embodiments, the shape and/or dimensions of attractant cavity 325 may be dependent on a manufacturing process used to create fish attractant dispersal apparatus 200 and/or dispersal pouch 210, as discussed further herein.

In various embodiments, and with reference again to FIG. 2, dispersal pouch 210 may comprise a material configured to dissolve in liquid. In that regard, in response to dispersal pouch 210 being cast or thrown into a body of water, dispersal pouch 210 may at least partially dissolve and disperse fish attractant 160 stored in attractant cavity 225. For example, dispersal pouch 210 may comprise a water-soluble plastic compound configured to at least partially dissolve in water, or other liquids. As a further example, dispersal pouch 210 may comprise a water-soluble paper, and/or any other suitable or desired water-soluble material. In various embodiments, dispersal pouch 210 may comprise a polyvinyl alcohol material (e.g., PVOH, PVA, or PVAL; $(C_2H_4O)x$; Chemical Abstracts Service (CAS) Registry Number 9002-89-5). The polyvinyl alcohol may comprise a water-soluble synthetic polymer and may be formed as a plastic film, a webbing or net, a paper material, and/or the like. In various embodiments, dispersal pouch 210 may be made of a biodegradable material, such as a biodegradable paper or plastic.

In various embodiments, a rate of dissolution of dispersal pouch 210 may be effected by various operating factors. For example, operating factors may comprise water temperature (e.g., higher water temperatures increases the rate of dissolution, lower water temperatures decreases the rate of dissolution, etc.), material thickness (e.g., greater material thickness decreases the rate of dissolution, smaller material thickness increases the rate of dissolution), material type (e.g., different water-soluble materials may comprise different rates of dissolution), material surface type (e.g., a solid material may dissolve a slower rate than a webbing material), and/or the like.

In accordance with various embodiments, dispersal pouch 210 may be configured to comprise material properties (e.g., material type, material thickness, material surface type, etc.) such that the rate of dissolution of dispersal pouch 210 may enable fish attractant dispersal apparatus 200 to at least partially sink in the body of water before dispersing fish attractant 160. For example, and in accordance with various embodiments, dispersal pouch 210 may comprise material properties such that dispersal pouch 210 does not disperse fish attractant 160 for a time period of at least 30 seconds. As a further example, and in accordance with various embodiments, dispersal pouch 210 may comprise material properties such that dispersal pouch 210 does not disperse fish attractant 160 for a time period of at least 60 seconds. As a further example, and in accordance with various embodiments, dispersal pouch 210 may comprise material properties such that dispersal pouch 210 does not disperse fish attractant 160 for a time period of about 15 seconds to about 30 seconds, about 30 seconds to about 45 seconds, or about 15 seconds to about 45 seconds (wherein about as used in this context refers only to +/−5 seconds). In various embodiments, dispersal pouch 210 may comprise any other suitable or desired material properties to control the time period of dissolution.

In various embodiments, dispersal pouch 210 may comprise any suitable or desired material thickness. For example, dispersal pouch 210 may comprise a material thickness of about 10 micrometers (0.0003937 inches) to about 100 micrometers (0.003937 inches). As a further example, dispersal pouch 210 may comprise a material thickness of about 10 micrometers (0.0003937 inches) to about 25 micrometers (0.00098425 inches), about 25 micrometers (0.00098425 inches) to about 50 micrometers (0.0019685 inches), about 50 micrometers (0.0019685 inches) to about 75 micrometers (0.00295275 inches), about 75 micrometers (0.00295275 inches) to about 100 micrometers (0.003937 inches), and/or the like (wherein about as used in any of the above contexts refers only to +/−5 micrometers (0.00019685 inches)). In various embodiments, the material thickness may be configurable to at least partially control the rate of dissolution of dispersal pouch 210.

In various embodiments, a user may attach fish attractant dispersal apparatus 200 to a fishing hook (e.g., hook 16, with brief reference to FIG. 1) using any suitable method. For example, the fishing hook may be inserted through a portion of fish attractant dispersal apparatus 200 to couple fish attractant dispersal apparatus 200 to the fishing hook. The fishing hook may be inserted through any suitable or desired portion of dispersal pouch 210. For example, the fishing hook may be inserted through surface edge 220 to couple fish attractant dispersal apparatus 200 to the fishing hook. As a further example, the fishing hook may be inserted through attractant cavity 225 to couple fish attractant dispersal apparatus 200 to the fishing hook.

Figure 4:
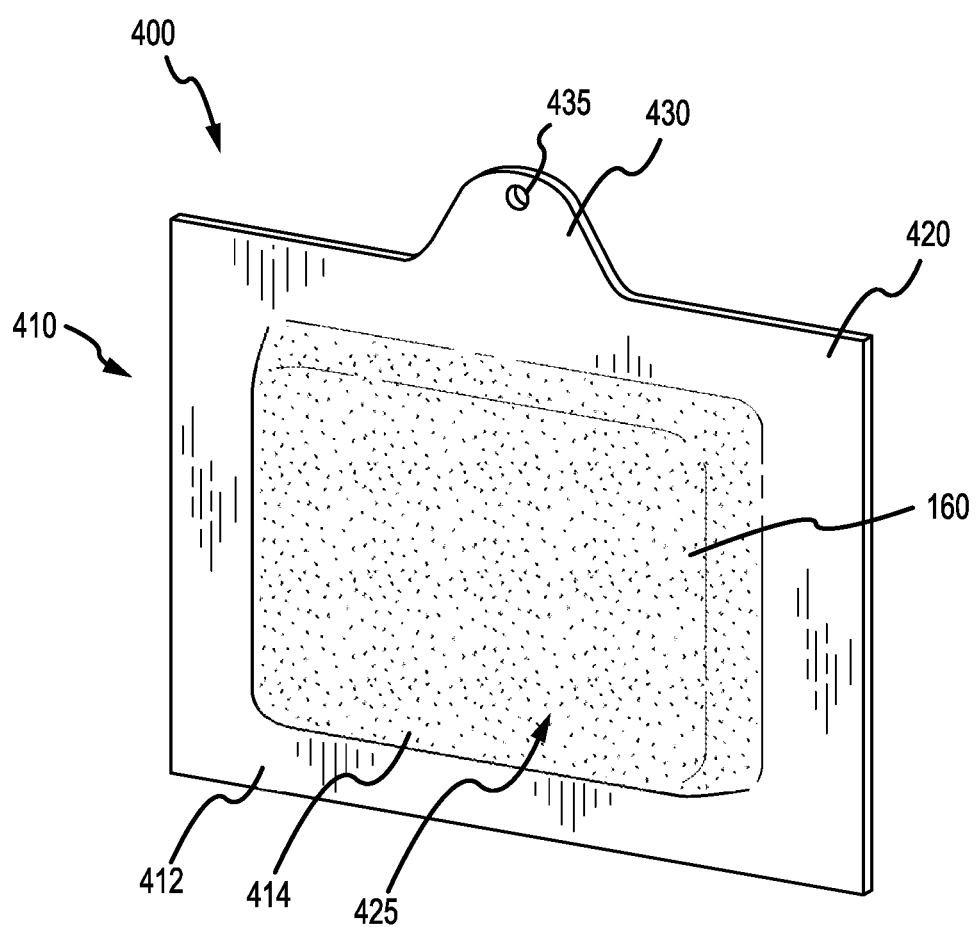
FIG. 4 illustrates a perspective view of a fish attractant dispersal apparatus comprising a hook tab, in accordance with various embodiments.

Fish attractant dispersal apparatus 200 may also comprise one or more components or surfaces to aid in coupling a fishing hook to fish attractant dispersal apparatus 200. For example, in accordance with various embodiments and with reference to FIG. 4, a fish attractant dispersal apparatus 400 may comprise a dispersal pouch 410 comprising a hook tab 430. Fish attractant dispersal apparatus 400 may be similar to fish attractant dispersal apparatus 200, with brief reference to FIG. 2. Dispersal pouch 410 may be similar to dispersal pouch 210, with brief reference to FIG. 2, and may comprise an outer surface 412 opposite an inner surface 414. Inner surface 414 may define an attractant cavity 425 configured to encompass and store fish attractant 160. Attractant cavity 425 may be similar to attractant cavity 225, with brief reference to FIG. 2. Outer surface 412 may define a surface edge 420. Surface edge 420 may comprise an outer edge of dispersal pouch 410 that at least partially surrounds and defines attractant cavity 425.

Surface edge 420 may comprise hook tab 430. For example, outer surface 412 may also define hook tab 430 extending from surface edge 420. Hook tab 430 may be configured to provide a surface to allow a fishing hook to attach to. For example, a user may insert the fishing hook through hook tab 430 to couple the fishing hook to fish attractant dispersal apparatus 400. In various embodiments, hook tab 430 may comprise a first thickness greater than the thickness of surface edge 420. Hook tab 430 may be reinforced with extra material to aid in retaining coupling of the fishing hook to fish attractant dispersal apparatus 400. Hook tab 430 may also comprise a first material different than the material of surface edge 420. For example, hook tab 430 may comprise a plastic material, a metal material, or the like that is not water-soluble.

Hook tab 430 may comprise a hook hole 435. Hook hole 435 may define a portion of hook tab 430 designed and configured to receive a fishing hook. In various embodiments, hook hole 435 may define an aperture through outer surface 412 on hook tab 430. The aperture may be sized and shaped to receive and retain a fishing hook. In various embodiments, hook hole 435 may comprise a portion of hook tab 430 comprising a second thickness less than a first thickness of hook tab 430. The second thickness may be configured to allow the user to easily insert the fishing hook through hook tab 430.

In various embodiments, and with reference again to FIG. 2, fish attractant 160 may comprise any suitable or desired substance configured to attract fish. For example, fish attractant 160 may comprise a substance configured to attract fish through olfactory, sight, taste, etc. Fish attractant 160 may comprise any suitable fish attractant, and may comprise any suitable form (e.g., liquid, solid, powder, etc.). For example, fish attractant 160 may comprise a solid fish attractant, an amino acid, an oil-based fish attractant, and/or any other suitable or desired fish attractant.

Solid fish attractants may include fish meal, animal proteins, corn, wheat, bread, liver, krill, blood meal, shrimp meal, liver meal, and/or the like. In various embodiments, the solid fish attractants may also include fructose, crayfish meal, mussel (clam) meal or extract, garlic, yeast powder, spirulina, chili powder, salt, kelp meal, tiger nut flour, squid meal, bird foods, bloodworm meal, hemp seed, milk powder, peanut flour, almond flour, vanilla meal, and/or the like.

Amino acids may include glycine, alanine, proline, arginine, taurine, valine, betaine, and/or any other suitable or desired amino acid. In various embodiments, the amino acids may include inosine, L-alanine, L-glutamic acid, L-arginine, glycine, leucine, isoleucine, proline, phenylalanine, tryptophan, methionine, glutamate, arginine, taurine, urea, and/or any other suitable or desired free amino acids.

Oil-based fish attractant may comprise fish oil, cod liver oil, pilchard oil, hemp oil, sunflower oil, olive oil, and/or the like. In various embodiments, the oil-based attractant (or liquid-based attractant) may include liquid betaine, liquid sweetener, molasses, krill oil, shrimp oil, black pepper oil, thyme oil, liquid bloodworm extract, n-butyric acid, and/or the like. As discussed further herein, oil-based fish attractant may be mixed with other fish attractant, may be in a liquid form, and may be encapsulated in a capsule or similar dissolvable means.

In various embodiments, fish attractant 160 may be a mix of one or more of the above-described exemplary fish attractants. For example, fish attractant 160 may comprise a mix of a solid fish attractant (e.g., fish meal) and an oil-based fish attractant (e.g., fish oil). As a further example, fish attractant 160 may comprise a mix of one or more of any other fish attractants.

Figure 5:
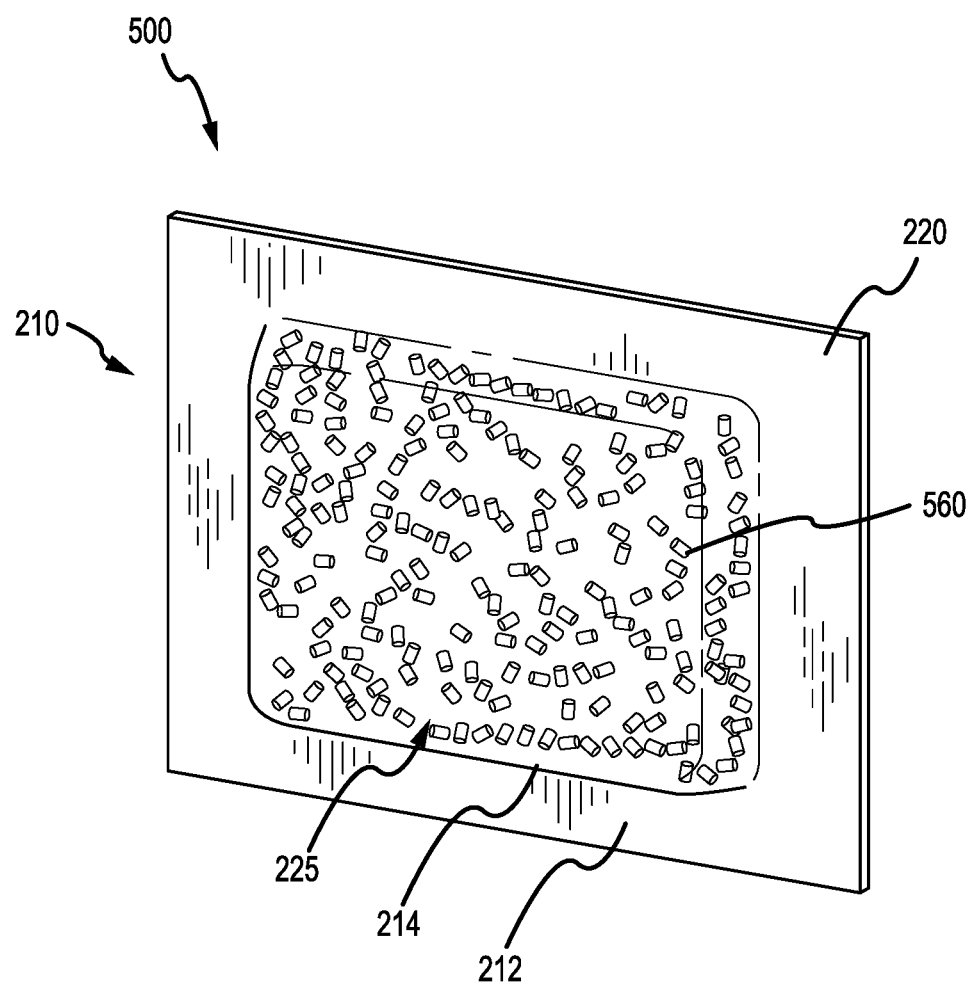
FIG. 5 illustrates a perspective view of a fish attractant dispersal apparatus comprising a fish attractant in a pellet form, in accordance with various embodiments.

In various embodiments, fish attractant 160 may comprise any suitable or desired composition or form. For example, fish attractant 160 may comprise a powder composition (e.g., as depicted in FIG. 2), a liquid composition, and/or the like. With reference to FIG. 5, and in accordance with various embodiments, a fish attractant dispersal apparatus 500 may comprise a fish attractant 560 having a pellet form. Fish attractant dispersal apparatus 500 may be similar to fish attractant dispersal apparatus 200, with brief reference to FIG. 2. Fish attractant 560 may be similar to fish attractant 160, with brief reference to FIG. 2. In various embodiments, fish attractant 560 comprising a pellet form may aid in fish attractant 560 sinking in water and/or floating in water. The pellet form may also slow the rate of dissolution of fish attractant 560 in the water.

In various embodiments, and with reference again to FIG. 2, fish attractant dispersal apparatus 200 may comprise any suitable or desired amount of fish attractant 160. For example, fish attractant dispersal apparatus 200 may comprise about 0.10 ounces (2.835 grams) to about 0.50 ounces (14.175 grams), about 0.50 ounces (14.175 grams) to about 1 ounce (28.35 grams), about 1 ounce (28.35 grams) to about 2 ounces (56.7 grams), about 2 ounces (56.7 grams) to about 5 ounces (141.7 grams), at least about 5 ounces (141.7 grams), and/or the like of fish attractant 160 (wherein about as used in any of the above contexts comprises only +/−0.05 ounces (1.42 grams)).

In various embodiments, an amount of fish attractant 160 in fish attractant dispersal apparatus 200 may be based on one or more fishing variables, such as, for example, a fish type, a fishing rod action, and/or the like. For example, when fishing for small fish (e.g., trout) and/or using a light-action fishing rod, it may be desirable for fish attractant dispersal apparatus 200 to comprise about 0.50 ounces (14.175 grams) of fish attractant 160. For example, when fishing for medium fish (e.g., catfish) and/or using a medium-action fishing rod, it may be desirable for fish attractant dispersal apparatus 200 to comprise about 1 ounce (28.35 grams) to about 2 ounces (56.7 grams) of fish attractant 160. For example, when fishing for larger fish and/or using a heavy-action fishing rod, it may be desirable for fish attractant dispersal apparatus 200 to comprise at least 5 ounces (141.7 grams) of fish attractant 160 (wherein about as used in any of the above contexts comprises only +/−0.05 ounces (1.42 grams)). In that regard, an amount of fish attractant 160 in fish attractant dispersal apparatus 200 may be configurable for different types of fishing and using different types of fishing rods.

Figure 6A:
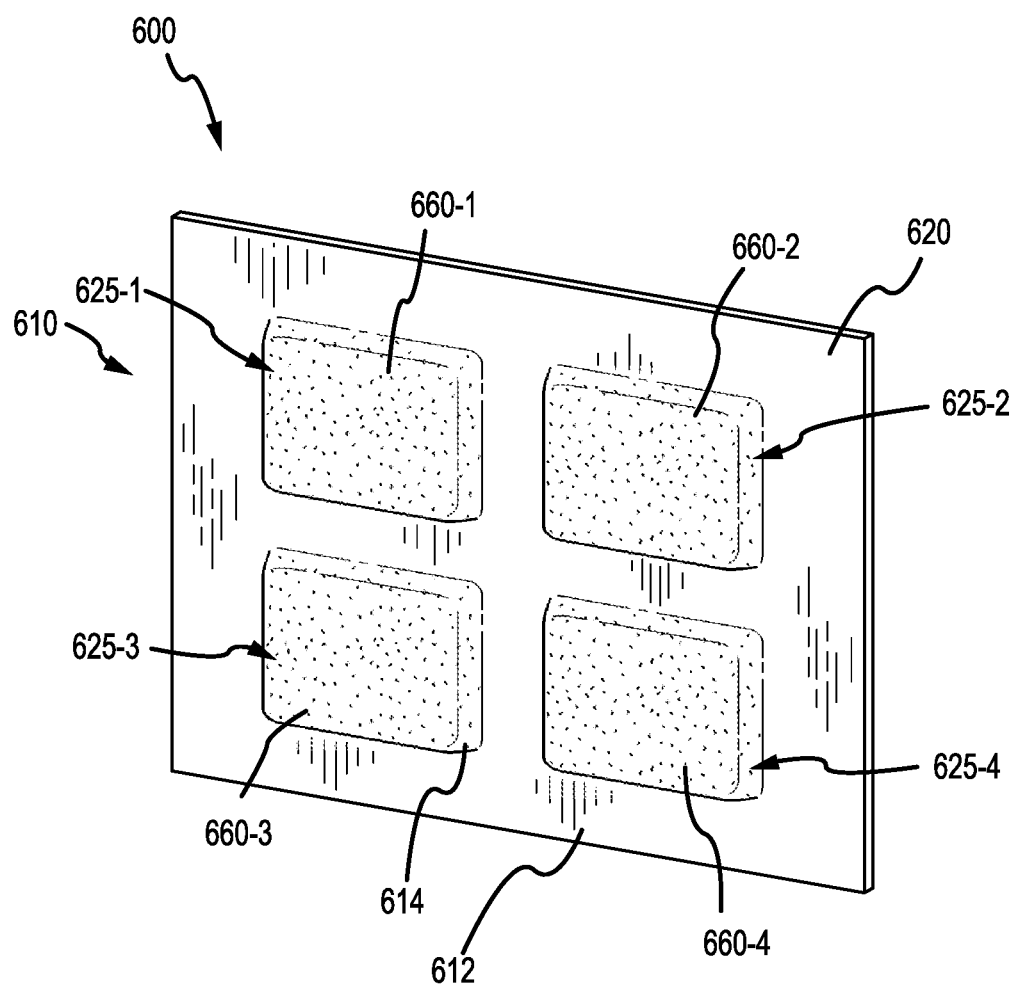
FIG. 6A illustrates a perspective view of a fish attractant dispersal apparatus comprising a dispersal pouch having divided subsections, in accordance with various embodiments.
Figure 6B:
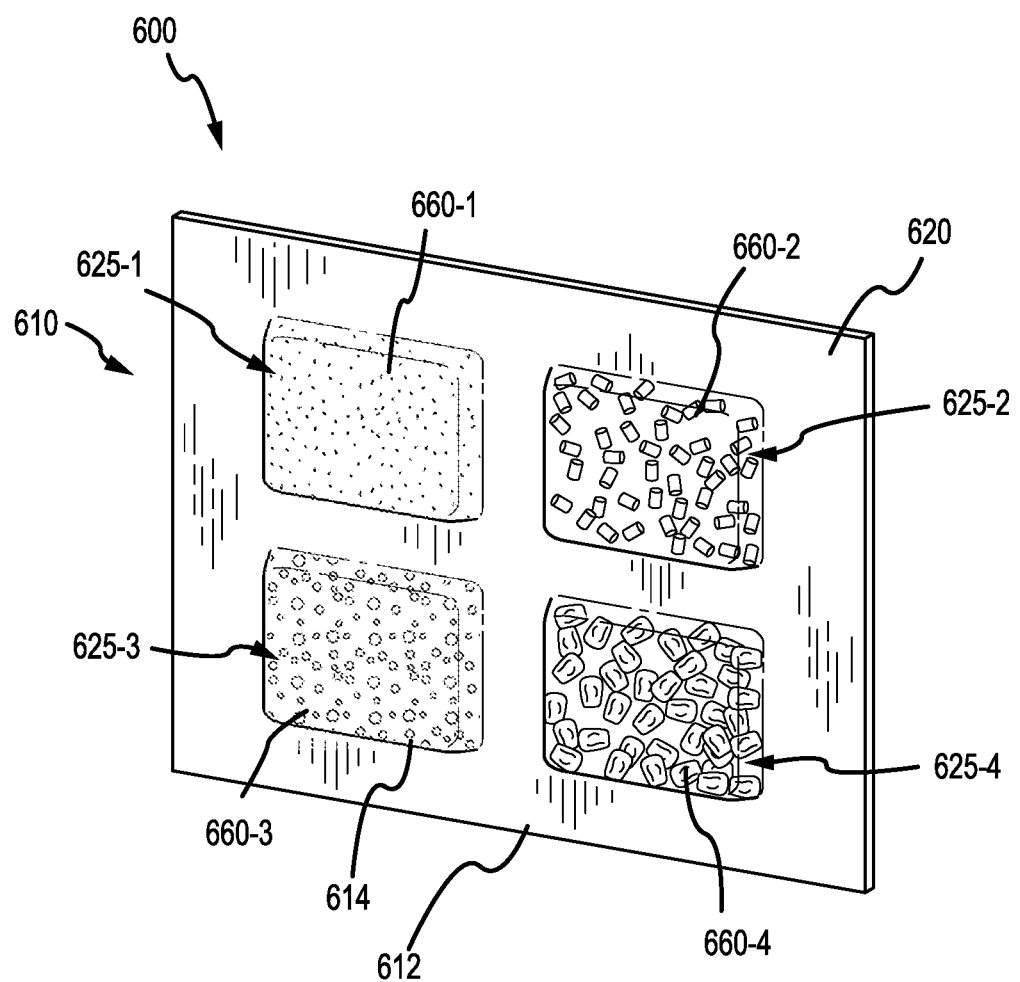
FIG. 6B illustrates a perspective view of a fish attractant dispersal apparatus comprising a dispersal pouch having divided subsections each comprising different forms of fish attractant, in accordance with various embodiments.

In various embodiments, and with reference to FIGS. 6A and 6B, a fish attractant dispersal apparatus 600 may comprise a dispersal pouch 610 comprising a plurality of attractant cavities (e.g., a multi-chambered fish attractant dispersal apparatus). Fish attractant dispersal apparatus 600 may be similar to fish attractant dispersal apparatus 200, with brief reference to FIG. 2. Dispersal pouch 610 may be similar to dispersal pouch 210, with brief reference to FIG. 2, and may comprise an outer surface 612 opposite an inner surface 614. Inner surface 614 may define a plurality of attractant cavities 625. Each attractant cavity 625 may be similar to attractant cavity 225, with brief reference to FIG. 2, and may be sized and shaped to encompass and store fish attract 660. Fish attractant 660 may be similar to fish attractant 160, with brief reference to FIG. 2. Outer surface 612 may define a surface edge 620. Surface edge 620 may be similar to surface edge 220, with brief reference to FIG. 2, and may comprise an outer surface of dispersal pouch 610 that at least partially surrounds and defines each attractant cavity 625.

For example, fish attractant dispersal apparatus 600 may comprise a first attractant cavity 625-1, a second attractant cavity 625-2, a third attractant cavity 625-3, a fourth attractant cavity 625-4, and/or any other number of attractant cavities. First attractant cavity 625-1 may encompass and store a first fish attractant 660-1. Second attractant cavity 625-2 may encompass and store a second fish attractant 660-2. Third attractant cavity 625-3 may encompass and store a third fish attractant 660-3. Fourth attractant cavity 625-4 may encompass and store a fourth fish attractant 660-4.

In various embodiments, one or more attractant cavities 625 may comprise outer surfaces comprising different material thicknesses. For example, first attractant cavity 625-1 may comprise a first thickness, second attractant cavity 625-2 may comprise a second thickness, third attractant cavity 625-3 may comprise a third thickness, and fourth attractant cavity 625-4 may comprise a fourth thickness. First thickness, second thickness, third thickness, and/or fourth thickness may comprise similar or different material thicknesses. For example, different material thickness may enable each attractant cavity 625 to disperse the respective fish attractant 660 at different rates.

In various embodiments, and with specific reference to FIG. 6A, each fish attractant 660 may comprise the same type of fish attractant. For example, first fish attractant 660-1, second fish attractant 660-2, third fish attractant 660-3, and fourth fish attractant 660-4 may each comprise the same type of fish attractant. In various embodiments, and with specific reference to FIG. 6B, one or more attractant cavities 625 may encompass a different type of fish attractant 660. For example, first fish attractant 660-1 may comprise a fish attractant comprising a powder form, second fish attractant 660-2 may comprise a fish attractant comprising a pellet form, third fish attractant 660-3 may comprise a fish attractant comprising a liquid form, fourth fish attractant 660-4 may comprise a solid fish attractant (e.g., corn), and/or the like.

Figure 7:
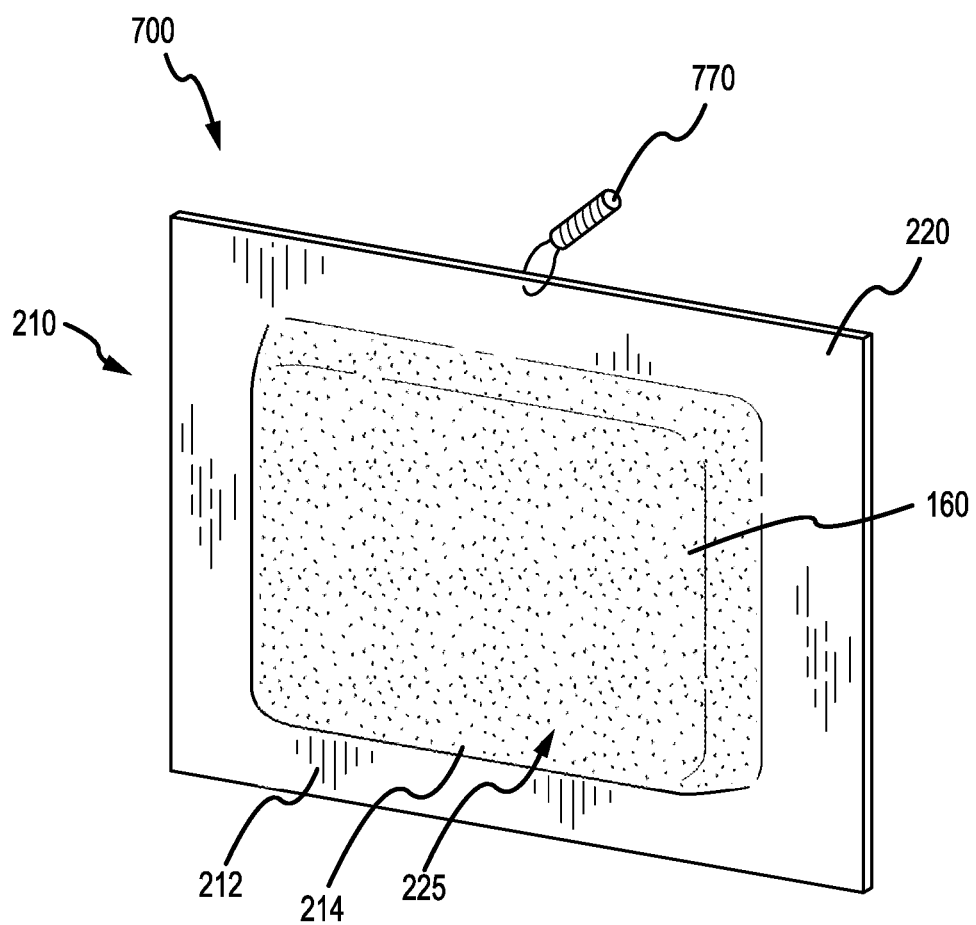
FIG. 7 illustrates a perspective view of a fish attractant dispersal apparatus comprising a weight, in accordance with various embodiments.

In various embodiments, and with reference to FIG. 7, fish attractant dispersal apparatus 200 may comprise one or more weights 770. Weight 770 may be configured to provide additional weight to fish attractant dispersal apparatus 200. For example, weight 770 may be configured to aid fish attractant dispersal apparatus 200 in sinking in water, in response to fish attractant dispersal apparatus 200 being in contact with the water (e.g., during casting, in response to a user throwing fish attractant dispersal apparatus 200, etc.). Weight 770 may comprise any suitable or desired weight, and may comprise any suitable or desired form. In various embodiments, weight 770 may be coupled to dispersal pouch 210. For example, weight 770 may comprise an attachment means and may be coupled to surface edge 220 of dispersal pouch 210 (e.g., as depicted in FIG. 2). In various embodiments, weight 770 may be coupled within dispersal pouch 210. For example, weight 770 may be inserted within attractant cavity 225 proximate fish attractant 160.

Figure 8:
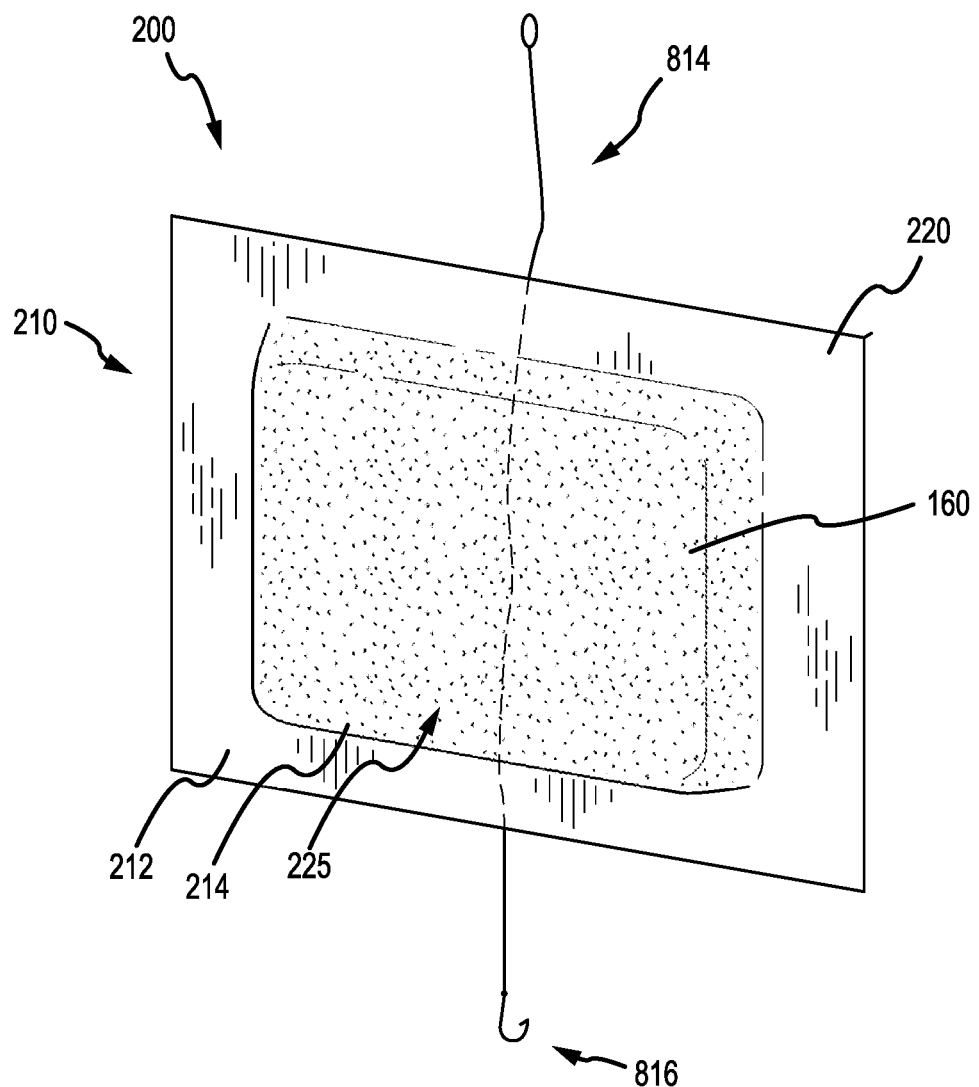
FIG. 8 illustrates a perspective view of a fish attractant dispersal apparatus comprising a fishing line and hook, in accordance with various embodiments.

In various embodiments, and with reference to FIG. 8, fish attractant dispersal apparatus 200 may comprise a preset fishing line 814 and hook 816. Hook may be coupled to a second end of fishing line 814. A first end of fishing line 814 may be configured to be coupled to a fishing line on a fishing rod. Fishing line 814 may be coupled to dispersal pouch 210. For example, fishing line 814 may be inserted through dispersal pouch 210 between outer surface 212. In that regard, a user may operate fish attractant dispersal apparatus 200 by attaching first end of fishing line 814 to the fishing line on the fishing rod, and may attach bait to hook 816. The user may operate the fishing rod to cast the bait together with fish attractant dispersal apparatus 200.

Figure 9:
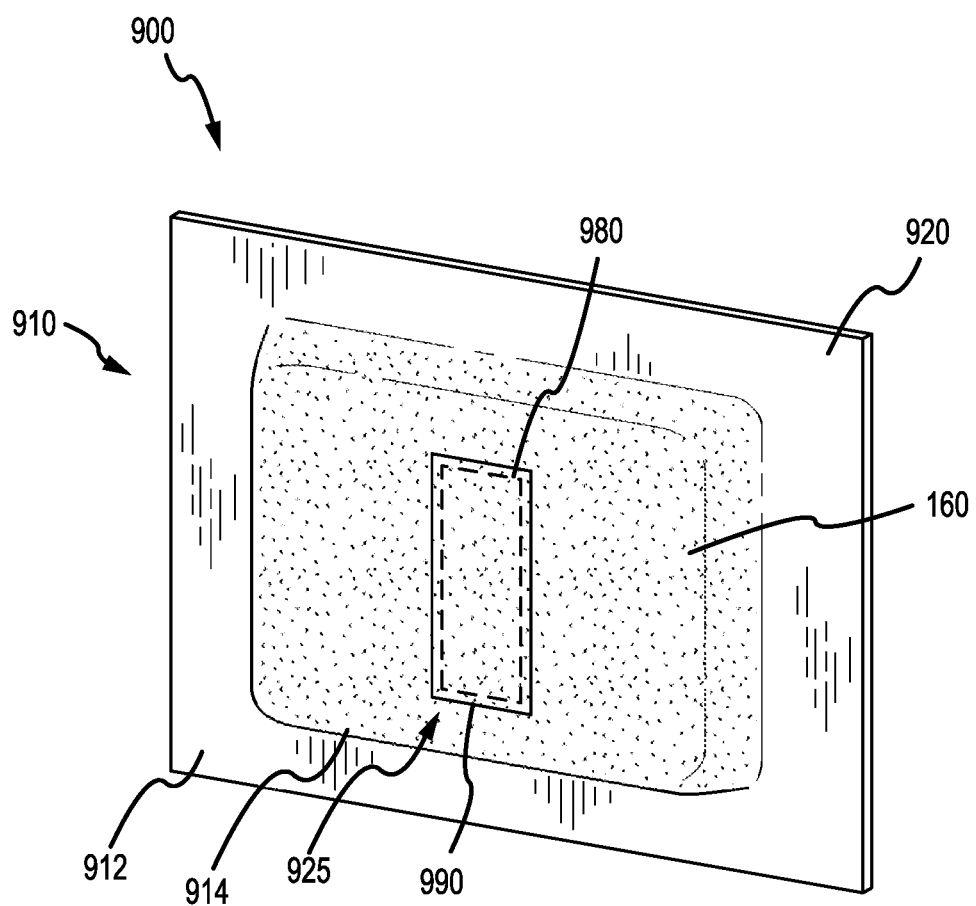
FIG. 9 illustrates a perspective view of a fish attractant dispersal apparatus comprising a reusable dispersal pouch, in accordance with various embodiments.

In various embodiments, and with reference to FIG. 9, a fish attractant dispersal apparatus 900 may be configured for reuse. Fish attractant dispersal apparatus 900 may be similar to fish attractant dispersal apparatus 200, with brief reference to FIG. 2. Fish attractant dispersal apparatus 900 may comprise a resealable dispersal pouch 910. Resealable dispersal pouch 910 may be similar to dispersal pouch 210, with brief reference to FIG. 2, and may comprise an outer surface 912 opposite an inner surface 914. Inner surface 914 may define an attractant cavity 925 configured to encompass and store fish attractant 160. Attractant cavity 925 may be similar to attractant cavity 225, with brief reference to FIG. 2. Outer surface 912 may define a surface edge 920. Surface edge 920 may be similar to surface edge 220, with brief reference to FIG. 2, and may comprise an outer edge of resealable dispersal pouch 910 that at least partially surrounds and defines attractant cavity 925.

Outer surface 912 of resealable dispersal pouch 910 proximate attractant cavity 925 may comprise a refill void 980. Refill void 980 may be in fluid communication with attractant cavity 925. Refill void 980 may be configured to enable a user to refill attractant cavity 925 with fish attractant 160. Fish attractant dispersal apparatus 900 may comprise a resealable surface 990 coupled to outer surface 912 and configured to at least partially obstruct refill void 980. For example, resealable surface 990 may comprise an adhesive configured to couple resealable surface 990 to outer surface 912. In that respect, resealable surface 990 may be placed over refill void 980 and coupled to the proximate outer surface 912 to seal attractant cavity 925.

In various embodiments, resealable dispersal pouch 910 may comprise a non-water-soluble material. Resealable surface 990 may comprise a water-soluble material, as discussed further herein. In that respect, in response to fish attractant dispersal apparatus 900 being in contact with water during a first operation, resealable surface 990 may dissolve to release fish attractant 160 from attractant cavity 925. A user may insert additional fish attractant 160 into attractant cavity 925, via refill void 980. A second resealable surface 990 may be coupled over refill void 980 and fish attractant dispersal apparatus 900 may be in contact with water during a second operation to release the additional fish attractant 160.

Figure 10:
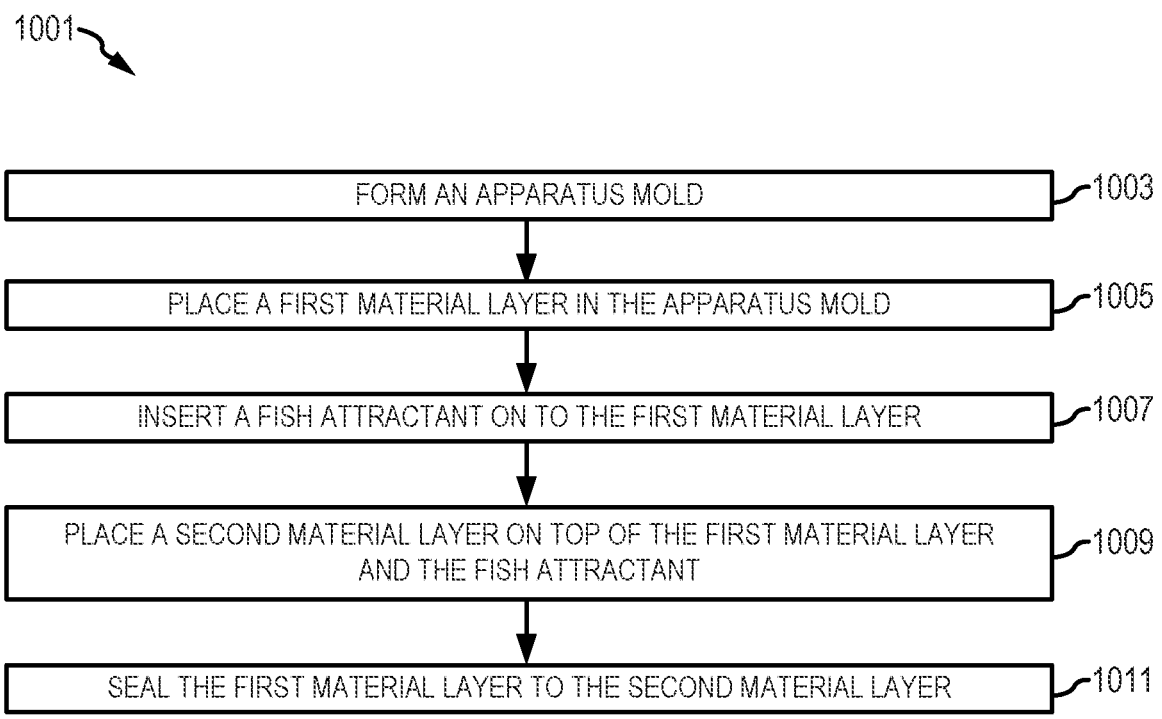
FIG. 10 illustrates a process flow for a method of manufacturing a fish attractant dispersal apparatus, in accordance with various embodiments.

With reference again to FIG. 2, fish attractant dispersal apparatus 200 may be formed using any suitable method. For example, in accordance with various embodiments and with reference to FIG. 10, a method 1001 of manufacturing a fish attractant dispersal apparatus is disclosed. Method 1001 may comprise forming an apparatus mold (step 1003). The apparatus mold may be sized and shaped similar to fish attractant dispersal apparatus. The apparatus mold may be formed using any suitable manufacturing technique and may comprise any suitable material. Although the foregoing makes reference to a single apparatus mold and forming a single fish attractant dispersal apparatus, it should be understood that a plurality of apparatus molds may be formed together such that a plurality of fish attractant dispersal apparatuses may be formed.

Method 1001 may comprise placing a first material layer in the apparatus mold (step 1005). The first material layer may comprise a water-soluble material (e.g., as discussed with reference to FIG. 2). Method 1001 may comprise inserting a fish attractant on to the first material layer (step 1007). The fish attractant may be placed on top of the first material layer in the apparatus mold. Method 1001 may comprise placing a second material layer on top of the first material layer and the fish attractant (step 1009). The second material layer may comprise a water-soluble material similar to the first material layer. In various embodiments, the second material layer may be placed such that no gas is trapped between the first material layer, the fish attractant, and/or the material second layer.

Method 1001 may comprise sealing the first material layer to the second material layer (step 1011). For example, a heat treatment may be applied to first material layer and second material layer to seal the first material layer to the second material layer. Sealing the layers may create an attractant cavity encompassing the fish attractant. In various embodiments, a vacuum sealing technique may also be applied to seal the first material layer to the second material layer, and/or to ensure that no gas is trapped within the formed attractant cavity. In various embodiments, the first material layer may also be sealed to the second material layer using heat sealing, an adhesive, and/or through any other suitable technique. In various embodiments, the first material layer may also be sealed to the second material layer using a mechanical force to reduce the amount of gas trapped in the formed attractant cavity.

Figure 11:
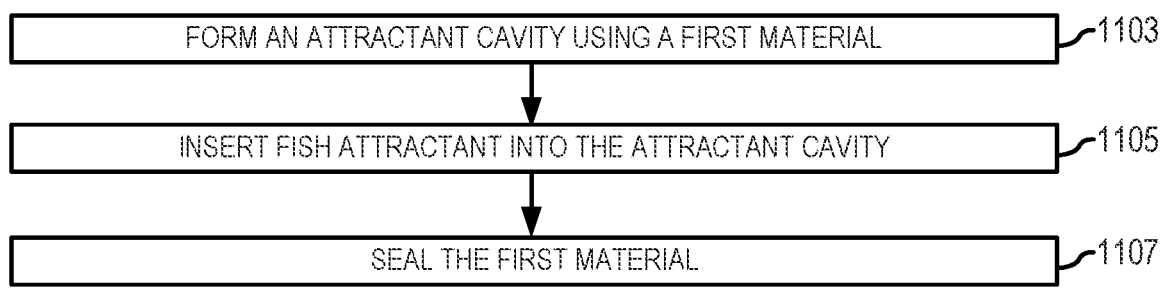
FIG. 11 illustrates a process flow for a method of manufacturing a fish attractant dispersal apparatus, in accordance with various embodiments.

In various embodiments, and with reference to FIG. 11, a method 1101 for manufacturing a fish attractant dispersal apparatus is disclosed. Method 1101 may comprise forming an attractant cavity using a first material (step 1103). The first material may comprise a water-soluble material (e.g., as discussed with reference to FIG. 2). In various embodiments, the first material may comprise a bag having an opening (e.g., the attractant cavity). In various embodiments, the first material may be folded and sealed along the edges to form the attractant cavity.

Method 1101 may comprise inserting fish attractant into the attractant cavity (step 1105). Method 1101 may comprise sealing the first material (step 1107). The first material may be sealed such that the formed attractant cavity encompasses the fish attractant, and a surface edge defines and/or encompasses the formed attractant cavity to retain the fish attractant. In various embodiments, the first material may be vacuum sealed such that the attractant cavity comprises no gas. The first material may also be heat sealed, sealed with an adhesive, or the like. In various embodiments, the first material may be sealed by a mechanical force to reduce the gas present in the attractant cavity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fish attractant dispersal apparatus, comprising:
a dispersal pouch defining an attractant cavity and comprising a hook tab extending from a surface edge of the dispersal pouch, wherein the hook tab is configured to receive a fishing hook, wherein the dispersal pouch comprises a water-soluble material.

2. The fish attractant dispersal apparatus of claim 1, further comprising a fish attractant disposed within the attractant cavity comprising at least one of a solid fish attractant, an amino acid, or an oil-based fish attractant.

3. The fish attractant dispersal apparatus of claim 2, wherein the solid fish attractant comprises at least one of a blood meal, a bloodworm meal, a crayfish meal, a fish meal, a kelp meal, a liver meal, a mussel meal or extract, a shrimp meal, a squid meal, a vanilla meal, an animal protein, a corn, a wheat, a bread, a liver, a krill, a fructose, a garlic, a *spirulina*, a chili powder, a salt, a bird food or seed, a hemp seed, an almond flour, a milk powder, a peanut flour, a tiger nut flour, or a yeast powder.

4. The fish attractant dispersal apparatus of claim 2, wherein the amino acid comprises at least one of alanine, arginine, betaine, glutamate, glycine, inosine, isoleucine, L-glutamic acid, leucine, methionine, phenylalanine, proline, taurine, tryptophan, urea, or valine.

5. The fish attractant dispersal apparatus of claim 2, wherein the oil-based fish attractant comprises at least one of a liquid betaine, a black pepper oil, a liquid bloodworm extract, a cod liver oil, a fish oil, a hemp oil, a krill oil, molasses, n-butyric acid, an olive oil, a pilchard oil, a shrimp oil, a sunflower oil, a liquid sweetener, or a thyme oil.

6. The fish attractant dispersal apparatus of claim 1, further comprising a fish attractant disposed within the attractant cavity comprising at least one of a powder, a liquid, or a pellet.

7. The fish attractant dispersal apparatus of claim 1, further comprising a fish attractant disposed within the attractant cavity comprising an amount of about 0.5 ounces, about 1.0 to about 2.0 ounces, or about 5.0 ounces.

8. The fish attractant dispersal apparatus of claim 7, wherein the amount of the fish attractant is configurable based on a fish type or a fishing rod action.

* * * * *